US009980299B2

(12) United States Patent
Zaus et al.

(10) Patent No.: US 9,980,299 B2
(45) Date of Patent: May 22, 2018

(54) USE OF AN OMA MANAGEMENT OBJECT TO SUPPORT APPLICATION-SPECIFIC CONGESTION CONTROL IN MOBILE NETWORKS

(71) Applicant: INTEL IP CORPORATION, Santa Clara, CA (US)

(72) Inventors: Robert Zaus, München (DE); Martin Kolde, Neubiberg (DE); Jerome Parron, Fuerth (DE); Ana Lucia A. Pinheiro, Breinigsville, PA (US); Marta Martinez Tarradell, Hillsboro, OR (US); Hyung-Nam Choi, Hamburg (DE); Vivek Gupta, San Jose, CA (US); Chen-Ho Chin, Deerlijk (BE); Richard C. Burbidge, Shrivenham (GB); Candy Yiu, Beaverton, OR (US)

(73) Assignee: Intel IP Corporation, Santa Clara, CA (US)

( * ) Notice: Subject to any disclaimer, the term of this patent is extended or adjusted under 35 U.S.C. 154(b) by 574 days.

(21) Appl. No.: 14/582,382

(22) Filed: Dec. 24, 2014

(65) Prior Publication Data

US 2015/0271708 A1    Sep. 24, 2015

Related U.S. Application Data

(60) Provisional application No. 61/969,778, filed on Mar. 24, 2014.

(51) Int. Cl.
*H04W 76/02* (2009.01)
*H04W 4/00* (2018.01)
(Continued)

(52) U.S. Cl.
CPC ........... *H04W 76/02* (2013.01); *H04W 4/001* (2013.01); *H04W 28/08* (2013.01);
(Continued)

(58) Field of Classification Search
CPC .... H04W 76/02; H04W 76/027; H04W 28/08
See application file for complete search history.

(56) References Cited

U.S. PATENT DOCUMENTS

2008/0095067 A1* 4/2008 Rao ................... H04W 8/245
                                                 370/252
2011/0317571 A1* 12/2011 Kokkinen ............. H04W 24/00
                                                 370/252

(Continued)

FOREIGN PATENT DOCUMENTS

JP    2014022986 A    2/2014
JP    2015/526985 A    9/2015
(Continued)

OTHER PUBLICATIONS

NTT DOCOMO WID for Study on Application specific Congestion control for Data; S1-134034; 3GPP TSG-SA WG1 #63; Zabreg, Croatia; Aug. 9, 2013.

(Continued)

*Primary Examiner* — Redentor Pasia
(74) *Attorney, Agent, or Firm* — Thorpe North & Western

(57) ABSTRACT

Technology for using an open mobile alliance (OMA) management object (MO) for congestion control in mobile networks is described. A novel type of OMA MO for application specific access control (ASAC) can include internet protocol (IP) flow descriptions that can be used to characterize applications with fine granularity. Priorities can be assigned to IP flows based on the IP flow descriptions. A user equipment (UE) can receive such an OMA MO and also receive application-barring information regarding a congestion level in a mobile network with which an application at the UE wishes to connect. The UE can have a connectivity manager (CM) that determines whether to allow the application to establish a connection with the mobile network (Continued)

based on the priority level of the application's associated IP flow and the application-barring information.

30 Claims, 13 Drawing Sheets

(51) Int. Cl.
*H04W 28/08* (2009.01)
*H04W 8/18* (2009.01)
*H04W 48/08* (2009.01)

(52) U.S. Cl.
CPC ............ *H04W 76/027* (2013.01); *H04W 8/18* (2013.01); *H04W 48/08* (2013.01)

(56) References Cited

U.S. PATENT DOCUMENTS

| | | |
|---|---|---|
| 2013/0045706 A1 | 2/2013 | Hsu |
| 2013/0170351 A1* | 7/2013 | Reznik .................... H04L 41/12 370/235 |
| 2013/0205366 A1 | 8/2013 | Luna et al. |
| 2013/0227385 A1* | 8/2013 | Allen .................... G06F 17/241 715/209 |
| 2014/0010180 A1* | 1/2014 | Lee ...................... H04W 48/02 370/329 |
| 2014/0022898 A1* | 1/2014 | Kim ...................... H04W 8/22 370/230 |
| 2014/0133293 A1* | 5/2014 | Ismail .................. H04W 48/06 370/229 |
| 2015/0181403 A1 | 6/2015 | Tanaka et al. |
| 2015/0296483 A1* | 10/2015 | Shi ..................... H04W 72/1215 455/458 |
| 2016/0212653 A1* | 7/2016 | Wang .................. A61B 10/0051 |
| 2016/0285766 A1* | 9/2016 | Gottlib .............. H04W 28/0215 |

FOREIGN PATENT DOCUMENTS

| | | |
|---|---|---|
| KR | 20120113664 A | 10/2012 |
| WO | WO 2013/063984 A1 | 5/2013 |
| WO | WO 2014/021989 A1 | 2/2014 |

OTHER PUBLICATIONS

China Telecom; Controlling ongoing service when ACDC activated; S1-134011; 3GPP TSG-SA WG1 Meeting #63; Zagreb, Croatia Aug. 9, 2013.
Intel Corporation; Priority levels in ACDC; S1-134027; 3GPP TSG SA WG1 Meeting #63; Zagreb, Croatia; Aug. 9, 2013.
3GPP TS 24.312 V12.4.0 (Mar. 2014); Access Network Discovery and Selection Function (ANDSF) Management Object (MO) (Release 12).
Extended European Search Report dated Aug. 7, 2017; in EP Application No. 15769995.0; filed Feb. 18, 2015; 15 pages.
SA1; "TR 22.806 Version 1.0.0 on Feasibility study for Application specific Congestion control for Data Communication (FS_ACDC)"; 3GPP TSG TD SP-140070; (Mar. 5-7, 2014); 5 pages; TSG SA Meeting #63, Fukuoka, Japan; Agenda 14.16.

* cited by examiner

```
-- ASN1START

SystemInformationBlockType2 ::=     SEQUENCE {
ac-BarringInfo                      SEQUENCE {
    ac-BarringForEmergency              BOOLEAN,
    ac-BarringForMO-Signalling          AC-BarringConfig           OPTIONAL,  -- Need OP
    ac-BarringForMO-Data                AC-BarringConfig           OPTIONAL   -- Need OP
}                                                                  OPTIONAL,  -- Need OP
radioResourceConfigCommon           RadioResourceConfigCommonSIB,
ue-TimersAndConstants               UE-TimersAndConstants,
freqInfo                            SEQUENCE {
    ul-CarrierFreq                      ARFCN-ValueEUTRA           OPTIONAL,  -- Need OP
    ul-Bandwidth                        ENUMERATED {n6, n15, n25, n50, n75, n100}
                                                                   OPTIONAL,  -- Need OP
    additionalSpectrumEmission          AdditionalSpectrumEmission
},
mbsfn-SubframeConfigList            MBSFN-SubframeConfigList       OPTIONAL,  -- Need OR
timeAlignmentTimerCommon            TimeAlignmentTimer,
...,
lateNonCriticalExtension            OCTET STRING (CONTAINING SystemInformationBlockType2-v8h0-
IEs)                                OPTIONAL,  -- Need OP
[[  ssac-BarringForMMTEL-Voice-r9       AC-BarringConfig           OPTIONAL,  -- Need OP
    ssac-BarringForMMTEL-Video-r9       AC-BarringConfig           OPTIONAL   -- Need OP
]],
[[  ac-BarringForCSFB-r10               AC-BarringConfig           OPTIONAL   -- Need OP
]]
}

SystemInformationBlockType2-v8h0-IEs ::=   SEQUENCE {
multiBandInfoList                   SEQUENCE (SIZE (1..maxMultiBands)) OF
AdditionalSpectrumEmission          OPTIONAL,  -- Need OR
nonCriticalExtension                SystemInformationBlockType2-v9e0-IEs   OPTIONAL   -- Need OP
}

SystemInformationBlockType2-v9e0-IEs ::= SEQUENCE {
ul-CarrierFreq-v9e0                 ARFCN-ValueEUTRA-v9e0       OPTIONAL,  -- Cond ul-
FreqMax
nonCriticalExtension                SystemInformationBlockType2-v13xx-IEs   OPTIONAL --
Need OP
}

SystemInformationBlockType2-v13xx-IEs ::= SEQUENCE {
Congestion-level-indication    Integer (0 to maxCongestionLevels) OPTIONAL,  -- Need OP
nonCriticalExtension           SEQUENCE {}                        OPTIONAL   -- Need OP
}

AC-BarringConfig ::=                SEQUENCE {
ac-BarringFactor                    ENUMERATED {
                                        p00, p05, p10, p15, p20, p25, p30, p40,
                                        p50, p60, p70, p75, p80, p85, p90, p95},
ac-BarringTime                      ENUMERATED {s4, s8, s16, s32, s64, s128, s256, s512},
ac-BarringForSpecialAC              BIT STRING (SIZE(5))

}

MBSFN-SubframeConfigList ::=        SEQUENCE (SIZE (1..maxMBSFN-Allocations)) OF MBSFN-
SubframeConfig

-- ASN1STOP
```

FIG. 7

| SystemInformationBlockType2 field descriptions |
|---|
| *ac-BarringFactor* |
| If the random number drawn by the UE is lower than this value, access is allowed. Otherwise the access is barred. The values are interpreted in the range [0,1): p00 = 0, p05 = 0.05, p10 = 0.10,..., p95 = 0.95. Values other than p00 can only be set if all bits of the corresponding *ac-BarringForSpecialAC* are set to 0. |
| *ac-BarringForCSFB* |
| Access class barring for mobile originating CS fallback. |
| *ac-BarringForEmergency* |
| Access class barring for AC 10. |
| *ac-BarringForMO-Data* |
| Access class barring for mobile originating calls. |
| *ac-BarringForMO-Signalling* |
| Access class barring for mobile originating signalling. |
| *ac-BarringForSpecialAC* |
| Access class barring for AC 11-15. The first/leftmost bit is for AC 11, the second bit is for AC 12, and so on. |
| *Congestion-level-indication* |
| Indication of congestion level in the cell. There are up to maxCongestionLevels in the cell. Congestion-level-indication of 0 means no congestion. |
| *ac-BarringTime* |
| Mean access barring time value in seconds. |
| *additionalSpectrumEmission* |
| The UE requirements related to IE *AdditionalSpectrumEmission* are defined in TS 36.101 [42, table 6.2.4.1]. |
| *mbsfn-SubframeConfigList* |
| Defines the subframes that are reserved for MBSFN in downlink. |
| *multiBandInfoList* |
| A list of *additionalSpectrumEmission* i.e. one for each additional frequency band included in *multiBandInfoList* in *SystemInformationBlockType1*, listed in the same order. |
| *ssac-BarringForMMTEL-Video* |
| Service specific access class barring for MMTEL video originating calls. |
| *ssac-BarringForMMTEL-Voice* |
| Service specific access class barring for MMTEL voice originating calls. |
| *ul-Bandwidth* |
| Parameter: transmission bandwidth configuration, $N_{RB}$, in uplink, see TS 36.101 [42, table 5.6-1]. Value n6 corresponds to 6 resource blocks, n15 to 15 resource blocks and so on. If for FDD this parameter is absent, the uplink bandwidth is equal to the downlink bandwidth. For TDD this parameter is absent and it is equal to the downlink bandwidth. |
| *ul-CarrierFreq* |
| For FDD: If absent, the (default) value determined from the default TX-RX frequency separation defined in TS 36.101 [42, table 5.7.3-1] applies. For TDD: This parameter is absent and it is equal to the downlink frequency. |

FIG. 8

+CCONG parameter command syntax

| Command | Possible response(s) |
|---|---|
| +CCONG=[<mode>] | +CME ERROR: <err> |
| +CCONG? | +CCONG: <mode>,<CongLevel> |
| +CCONG=? | +CCONG: (list of supported <mode>s) |

FIG. 9a

+CCONG action command syntax

| Command | Possible response(s) |
|---|---|
| +CCONG | +CCONG: <CongLevel> |
| +CCONG=? | |

FIG. 9b

+CCONG action command syntax

| Command | Possible response(s) |
|---|---|
| +CCONG | +CCONG: <PrioLevel> |
| +CCONG=? | |

FIG. 9c

USE OF AN OMA MANAGEMENT OBJECT TO SUPPORT APPLICATION-SPECIFIC CONGESTION CONTROL IN MOBILE NETWORKS

RELATED APPLICATIONS

The present application claims priority to U.S. Provisional Patent Application No. 61/969,778, filed Mar. 24, 2014, the entire specification of which is hereby incorporated by reference in its entirety for all purposes.

BACKGROUND

Application specific congestion control for data communication (ACDC) is an ongoing 3GPP study in which service requirements are specified in order to allow or prohibit certain applications from initiating or maintaining communications in mobile networks. These service requirements can be defined by operators and/or be subject to regional regulations. ACDC is particularly of interest when network traffic congestion necessitates prioritizing some transmissions over others. Congestion control is typically accomplished at the mobile device level. For example, access class barring can be used to reduce congestion in a radio access network by denying access to a selected percentage of mobile devices. However, access class barring does not have the granularity to control the use and network access of specific types of applications operating on mobile devices.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein:

FIG. 7 illustrates a non-limiting example of code that may be used so that that application-barring information may be included in a system information broadcast in accordance with an example;

FIG. 8 illustrates a non-limiting example of a table of system information block 2 (SIB2) field descriptions that may be associated with the example code of FIG. 7;

FIG. 9a illustrates a table detailing a first non-limiting example of syntax for an attention (AT) command in accordance with an example;

FIG. 9b illustrates a table detailing a second no limiting example of syntax for an attention (AT) command in accordance with an example;

FIG. 9c illustrates a table detailing a third non-limiting example of syntax for an attention (AT) command in accordance with an example;

Figure 1A:
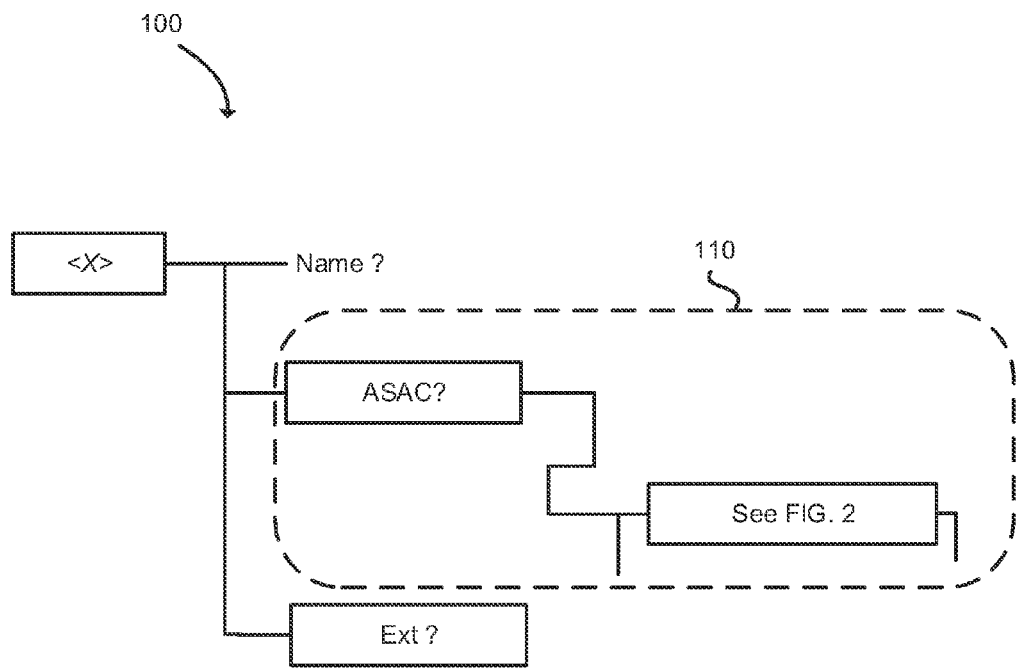
FIG. 1a is a diagram illustrating an exemplary structure of an application specific access control (ASAC) management object (MO) in accordance with an example.

Reference will now be made to the exemplary embodiments illustrated and specific language will be used herein to describe the same. It will nevertheless be understood that no limitation of the scope of the invention is thereby intended.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating steps and operations and do not necessarily indicate a particular order or sequence.

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

In accordance with current ACDC standards, a user equipment (UE) device can be pre-configured with an ACDC-allowed-application list based on operator policy and subject to regional regulations. A mobile network can also be allowed to dynamically configure a UE's ACDC-allowed-application list based on the mobile network operator's policy and subject to regional regulations. The mobile network can also be allowed to activate and/or deactivate ACDC control for certain types of UE-initiated applications. In accordance with embodiments of the present disclosure, when ACDC control is activated, a UE, regardless of whether the UE is in an idle mode or a connected mode, can determine which LIE-initiated applications will be allowed to initiate, maintain, and or use a network connection based on the UE's ACDC-allowed-application list.

The current 3GPP model provides some limited types of control regarding classes of applications that can be allowed to use network connections during periods of network traffic congestion. Access class barring (ACB), for example, allows networks to prohibit UEs from initiating random access channel (RACH) access for specific access classes and for some applications, such as circuit-switched fallback (CSFB). In addition, service-specific access control (SSAC)

allows networks to prohibit UEs from initiating any access for internet protocol multimedia subsystem (IMS) voice or video multimedia telephony services.

These limited types of control offered by the current 3GPP model, however, have several drawbacks. First, while ACB and SSAC allow some control based on application classes, they do not provide a way to distinguish between different applications that belong to the same access class. Second, if a UE is in a connected mode, ACB does not provide a way to control the establishment of a bearer for a newly opened application. Third, ACB and SSAC are applied separately; the coordination of their functionalities within the UE can be cumbersome.

Another possible approach to network congestion control involves using access point names (APNs). An Access Point Name (APN) refers to a gateway between a mobile network (e.g., a general packet radio service (GPRS) or a 3GPP network) and another computer network (e.g., the public internet). An APN identifies a packet data network (PDN) with which a UE seeks to communicate. An APN can also be used to identify a type of service that is provided by the associated PDN. It has been proposed that an APN or a combination of packet filters can be used to identify specific applications to which congestion control may be applied. However, this approach is also limited because many applications often share the same APN (e.g., the internet APN). Barring an entire APN because one application that uses that APN is creating network overload could therefore affect many other applications.

A packet filter could be applied based on, for example, transmission control protocol (TCP) port numbers. However, many different applications use hypertext transfer protocol (HTTP) and therefore use the same TCP port (port 80), so filtering based on port numbers might still affect many benign applications.

Hence, current ACDC concepts can be improved by defining a set of criteria that can distinguish applications with finer granularity. In addition, current ACDC concepts would also be improved if the details of which applications are barred could be provided to some entity (e.g., a connectivity manager (CM)) in the UE that is able to control the establishment of PDN connections via 3GPP before any related signaling is transferred via a radio interface.

In accordance with embodiments of the present disclosure, a set of interact protocol (IP) flow descriptions can be included in an Open Mobile Alliance (OMA) management object (MO). In this context, "objects" generally refer to the software constructs or data structures (e.g., in object-oriented programming settings). The OMA MO may be a newly defined management object that is primarily intended for ACDC purposes, such as an application specific access control (ASAC) MO. Alternatively, the OMA MO may simply be an modified version of an existing management object, such as an access network discovery and selection function (ANDSF) object (e.g., as defined in 3GPP TS 24.312). An IP flow description can comprise one or more of: an operating-system-specific application ID (OSAppID), a fully qualified domain name (FQDN), or one or more packet filter components (e.g., components as defined in Third Generation Partnership Project (3GPP) Technical Specification (TS) 24.312 version 12.6.0). Alternatively, an IP flow description can be empty (i.e., be an empty IP flow node). The IP flow descriptions included in the OMA MO can be used to characterize applications running on a UE with finer granularity. In some embodiments, an empty IP flow node can be used as a match-all IP flow that matches IP flows that do not have specific corresponding IP flow descriptions in the OMA MO object.

In one example, each IP flow described by an IP flow description included in the OMA MO can be assigned a priority level or a set of congestion levels in which network access is permitted. In some embodiments, a default priority level can also be assigned to any IP flows that are not described by IP flow descriptions included in the OMA MO. When congestion occurs in a mobile network, the mobile network can send a signal containing application-barring information (e.g., a congestion level) to a UE. The UE can be configured to determine whether a given UE application is allowed to establish and/or maintain a PDN connection if the priority level assigned to the UE application is sufficiently high relative to the congestion level in the network. Priority levels can be assigned for 3GPP access and/or for access through other radio access technologies.

In another example, the set of IP flow descriptions included in the OMA MO can comprise an ordered list. When congestion occurs in a mobile network, the mobile network can send a signal containing application-barring information to a UE. The application-barring information can comprise a bitmap with a number of bits corresponding to the number of IP flow descriptions; each bit can correspond to a specific IP flow description included in the OMA MO. The LIE can be configured to allow UE applications whose corresponding bits in the bitmap are set to 1 to establish and/or maintain PDN connections, while prohibiting UE applications whose corresponding bits in the bitmap are set to 0 from establishing and/or maintaining PDN connections.

In another example, application-barring information received by a UE can be provided to a connectivity manager (CM). The connectivity manager can use the application-barring information and the IP flow descriptions included in the OMA MO to decide how the UE is to respond to new application requests to establish PDN connections. In addition, the CM can use the application-barring information and the IP flow descriptions included in the OMA MO to determine how these new application requests (and the UE's response to them) will affect the transmission of uplink data packets for existing PDN connections (if at all). In some cases, it may be permissible to re-route traffic from certain IP flows to different radio access technologies (e.g., from 3GPP to a WLAN). In some embodiments, the CM may determine how a new application request will affect the transmission of uplink data packets for existing PDN connections by using one or more routing tables that are being used by the TCP/IP protocol stack of the UE to route uplink (UL) packets. The CM can add new rules to the routing tables or read, modify, or delete existing rules.

FIG. 1a is a diagram illustrating one example of a possible structure of an application specific access control (ASAC) management object (MO) 100. The ASAC MO 100 can be an object that comprises an ASAC container 110. In other words, the ASAC container 110, as depicted in 1a, can be a sub-object that is referenced in the ASAC MO 100. The ASAC container 110 can also comprise one or more sub-objects. These additional sub-objects are shown in greater detail in FIGS. 2-3.

Figure 1B:
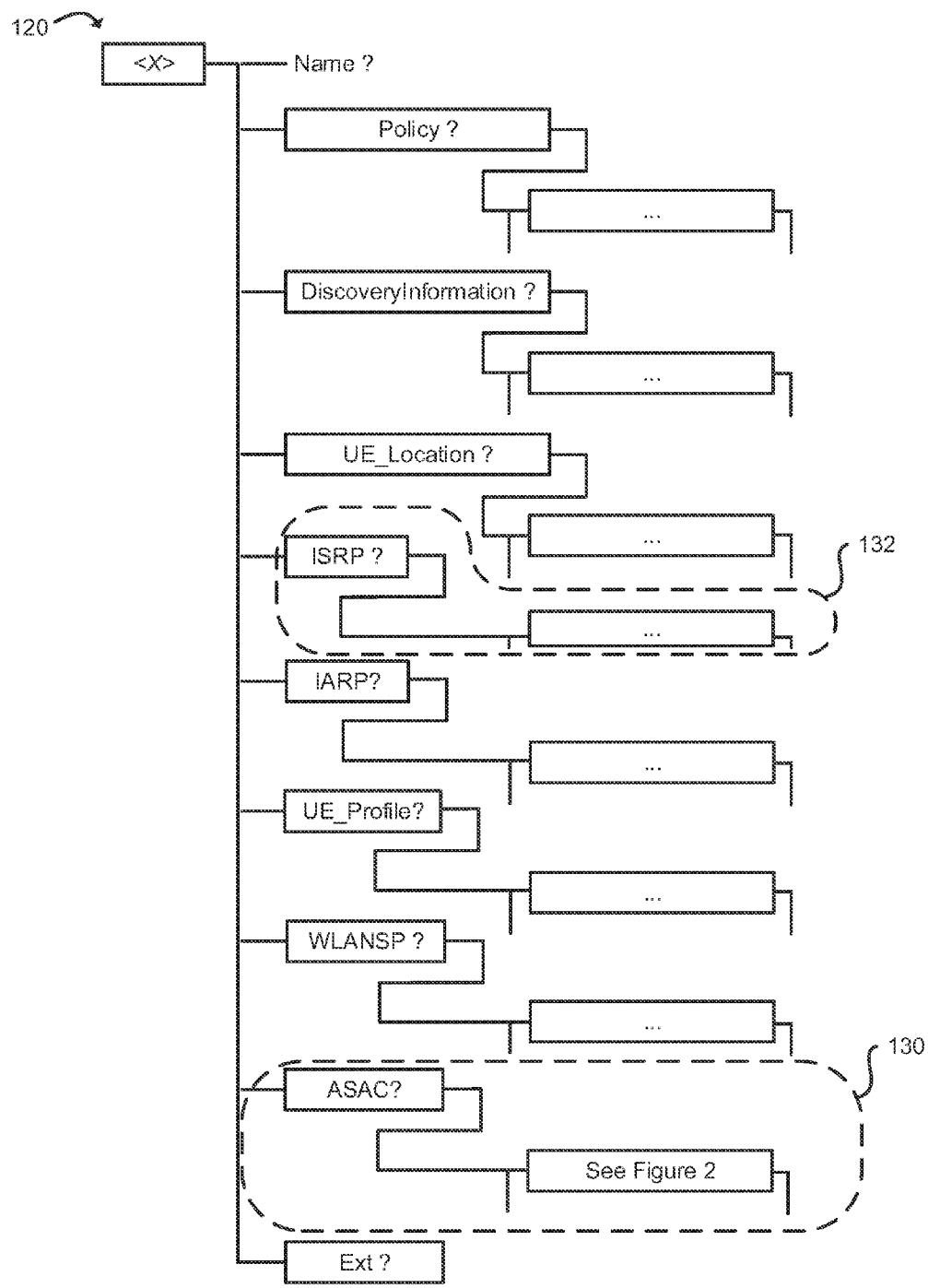
FIG. 1b is a diagram illustrating an exemplary modified structure of an access network discovery and selection function (ANDSF) management object (MO) in accordance with an example.

FIG. 1b is a diagram illustrating a modified structure of an access network discovery and selection function (ANDSF) management object (MO) 120 in accordance with another embodiment. The ANDSF MO can be an object that comprises an ASAC container 130. The ASAC container 130 can be a sub-object that is referenced in the ANDSF MO 120.

The ASAC container 130 can also comprise one or more sub-objects. These additional sub-objects are shown in greater detail in FIGS. 2-3.

Figure 2:
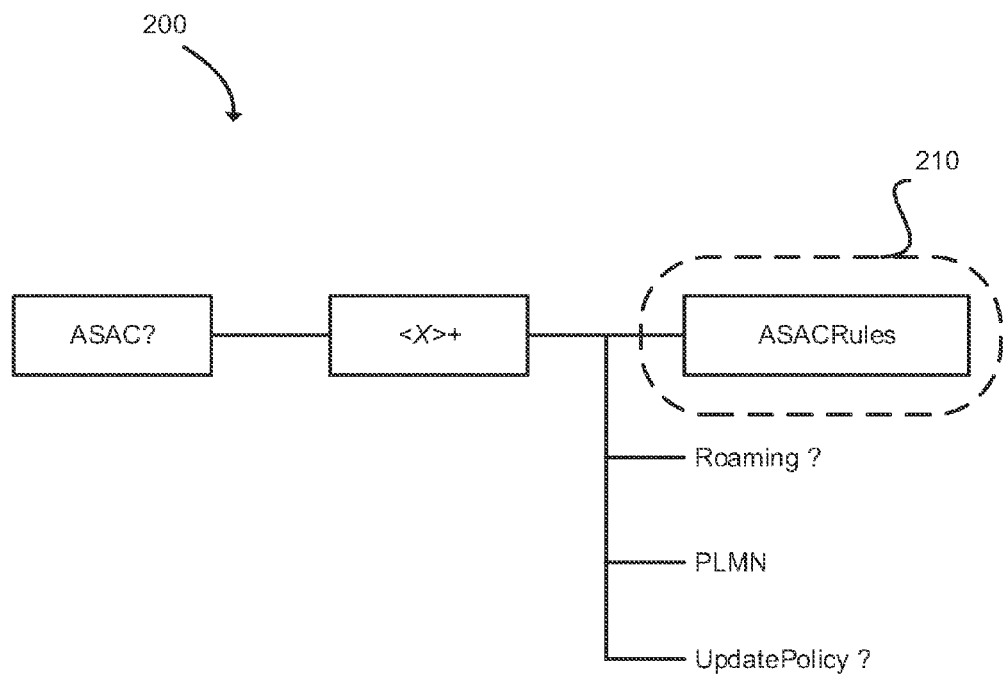
FIG. 2 is a diagram illustrating an exemplary structure of an ASAC container object in accordance with an example.

FIG. 2 is a diagram illustrating one example of a possible structure of an ASAC container 200 (i.e., an ASAC MO). The ASAC container 200 can be an object that comprises an ASAC Rules sub-object 210, a roaming leaf, a PLMN leaf, and an update policy leaf ("Leaf," as used in the context of some embodiments, can refer to an object or some other data construct a primitive data type variable, an array, or a record) that does not contain any references to additional objects. The ASAC Rules sub-object 210 (a.k.a., ASAC rules node) can also comprise one or more sub-objects and a set of ASAC rules. These additional sub-objects are shown in greater detail in FIG. 3. The PLMN leaf indicates the PLMN identity of the operator who defined the ASAC rules node. The roaming leaf indicates whether the ASAC rules node is applicable also when the UE is roaming in a different network. The update policy leaf indicates whether the UE needs to poll the network for an update of the MO data when the UE considers the data to be no longer valid.

Figure 3:
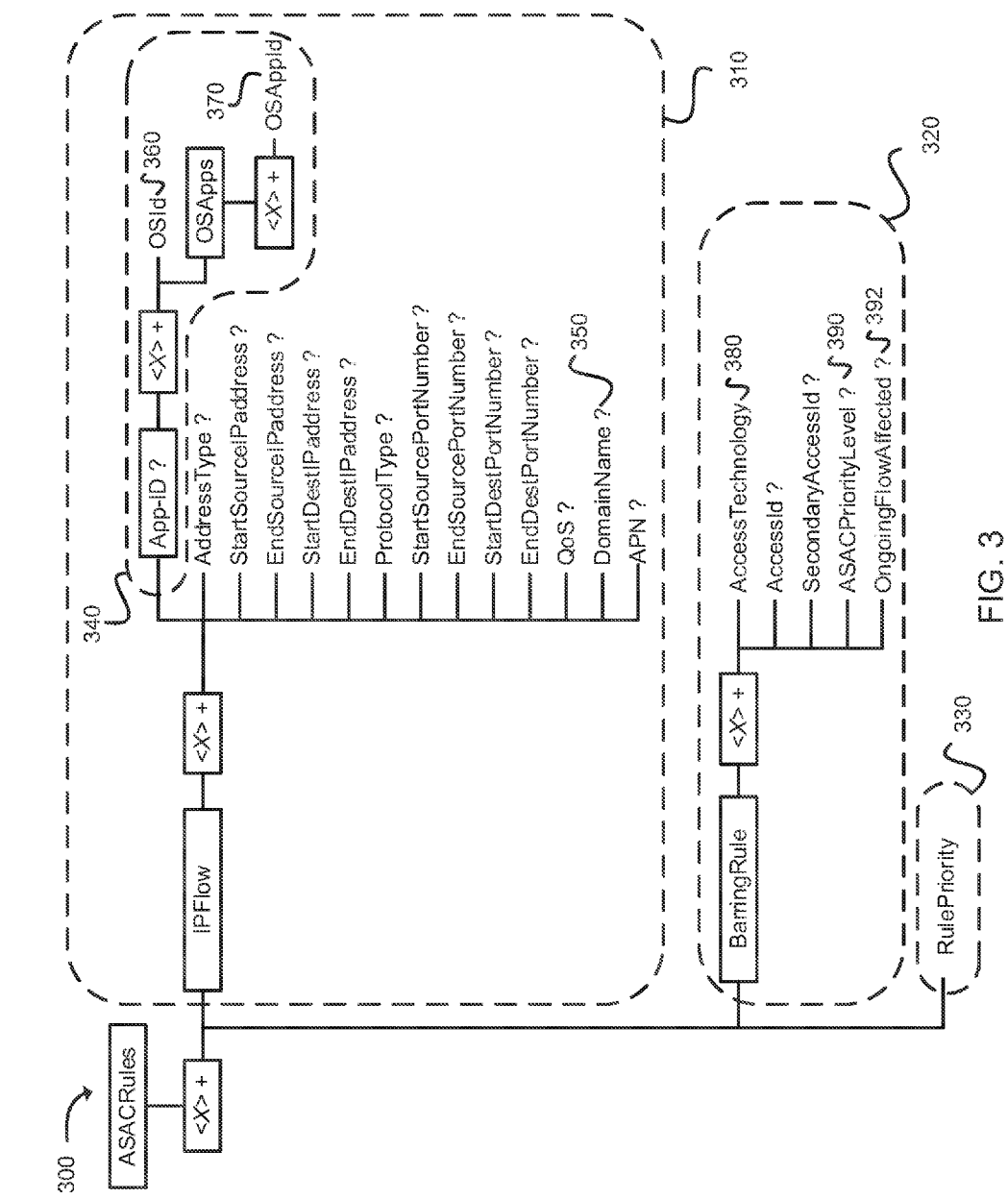
FIG. 3 is a diagram illustrating an exemplary structure of an ASAC rules node object in accordance with an example.

FIG. 3 is a diagram illustrating one example of a possible structure of an ASAC rules node 300 (a.k.a., ASAC Rules sub-object). An ASAC rules node 300 can comprise an IP flow node 310 (a.k.a., an IP flow sub-object), a barring rule node 320 (a.k.a., a barring rule sub-object), and a rule priority leaf 330.

An IP flow node 310 can comprise one or more IP flow descriptions. The IP flow node can also contain zero IP flow descriptions; in this case, the empty IP flow node can be interpreted as a match-all IP flow description. The IP flow description can comprise up to one App-ID node 340 (a.k.a., App-ID sub-object) and more leaves defining additional criteria, such as address type (e.g., IPv4 or IPv6), a range of source IP addresses, a range of destination IP addresses, a fully qualified domain name (FQDN), or an APN. An IP flow can be said match an IP flow description if the IP flow matches all the criteria.

An App-ID node 340 can comprise one or more operating system identifiers (OSIds) 360 and, for each operating system identifier, a set of one or more operating-system specific application identities (OSAppIds) 370. OSAppIds can be stored as strings in certain operating systems (e.g., Android, iOS, and Blackberry). An FQDN (e.g., Domain name 350 in FIG. 3) can be resolved into a destination IP address of an application server via a domain name system (DNS) query into an internee protocol (IP) address. In some embodiments, Domain name 350, OSId 360, and OSAppId 370 can be used to define IP flow descriptions.

A Barring Rule node 320 (a.k.a., Barring Rule sub-object) can comprise one or several sub-nodes, each of which can comprise an Access Technology leaf, an access ID leaf, a secondary access ID leaf, an ASAC priority level leaf, and an ongoing flow affected leaf. Access Technology 380 can specify the radio access technology to which priority levels apply. For certain radio access technologies, a specific radio access network can be further specified by an access M and optionally a secondary access ID. For example, for wireless local area networks (WLANs), the access ID can be given by a Service Set ID (SSID) and the secondary access ID by a Homogenous Extended Service Set ID (HESSID). The ASAC priority level leaf 390 can specify the priority level (or allowable congestion level, depending on the embodiment) that applies to IP flow node 310. It is possible to assign priority levels for one or more different radio access technologies. In some embodiments, the ASAC priority level may be stored as an integer number. In others, the allowable congestion level may be coded as a list of integers or as a bitmap.

The ongoing flow affected leaf 392 can specify whether a change in application-barring information affects one or more IP flows for which a PDN connection (i.e., ongoing IP flows) has already been established. In some embodiments, if the ongoing flow affected leaf 392 is not present, an ongoing IP flow is unaffected. If the ongoing flow affected leaf 392 is present, the ongoing flow affected leaf 392 can also indicate whether an ongoing flow can be barred and whether an ongoing flow can be rerouted through an alternative radio access technology. If an ongoing flow can be rerouted (e.g., though WLAN), a UE can still try to send affected uplink packets via the alternative radio access technology.

The rule priority leaf 330 can be used to determine which ASAC rule is to be applied if an IP flow matches several different IP flow descriptions. In some embodiments, ASAC rules can be prioritized and ASAC rules may be evaluated in order of priority to a matching IP flow.

Figure 4:
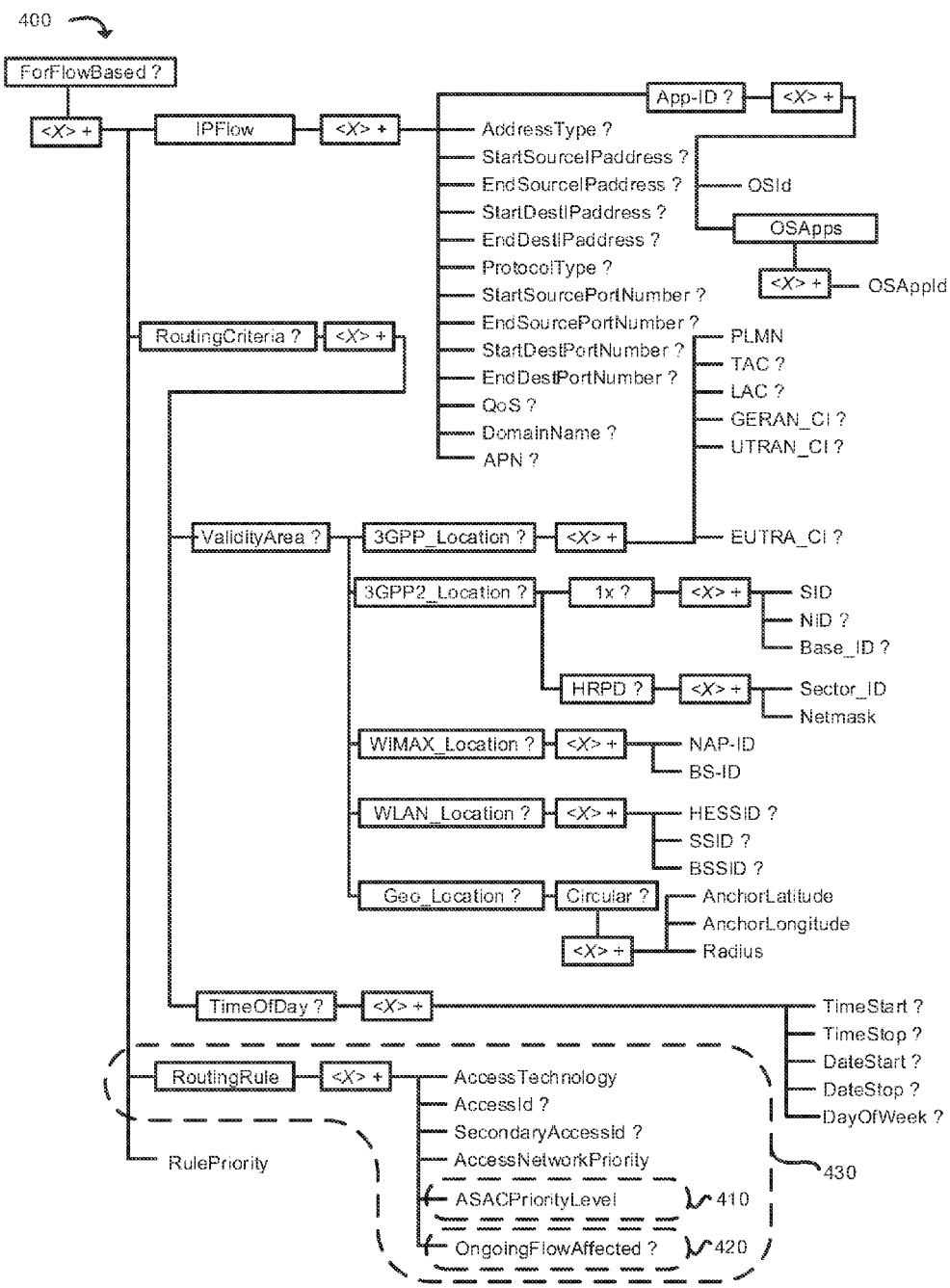
FIG. 4 is a diagram illustrating an exemplary structure of a ForFlowBased node that is a sub-object of an inter-system routing policy (ISRP) node object in accordance with an example.

FIG. 4 is a diagram illustrating an example of a possible structure of a ForFlowBased node 400 that is a sub-object of the inter-system routing policy (ISRP) node 132 depicted in the ANDSF MO 120 of FIG. 1*b*. In this example, the ASAC priority level leaf 410 and the ongoing flow affected leaf 420 can be included under the routing rule sub-object 430 as depicted. In this case, the ASAC priority level leaf 410 and the ongoing flow affected leaf 420 can be used in the same ways described above.

Figure 5:
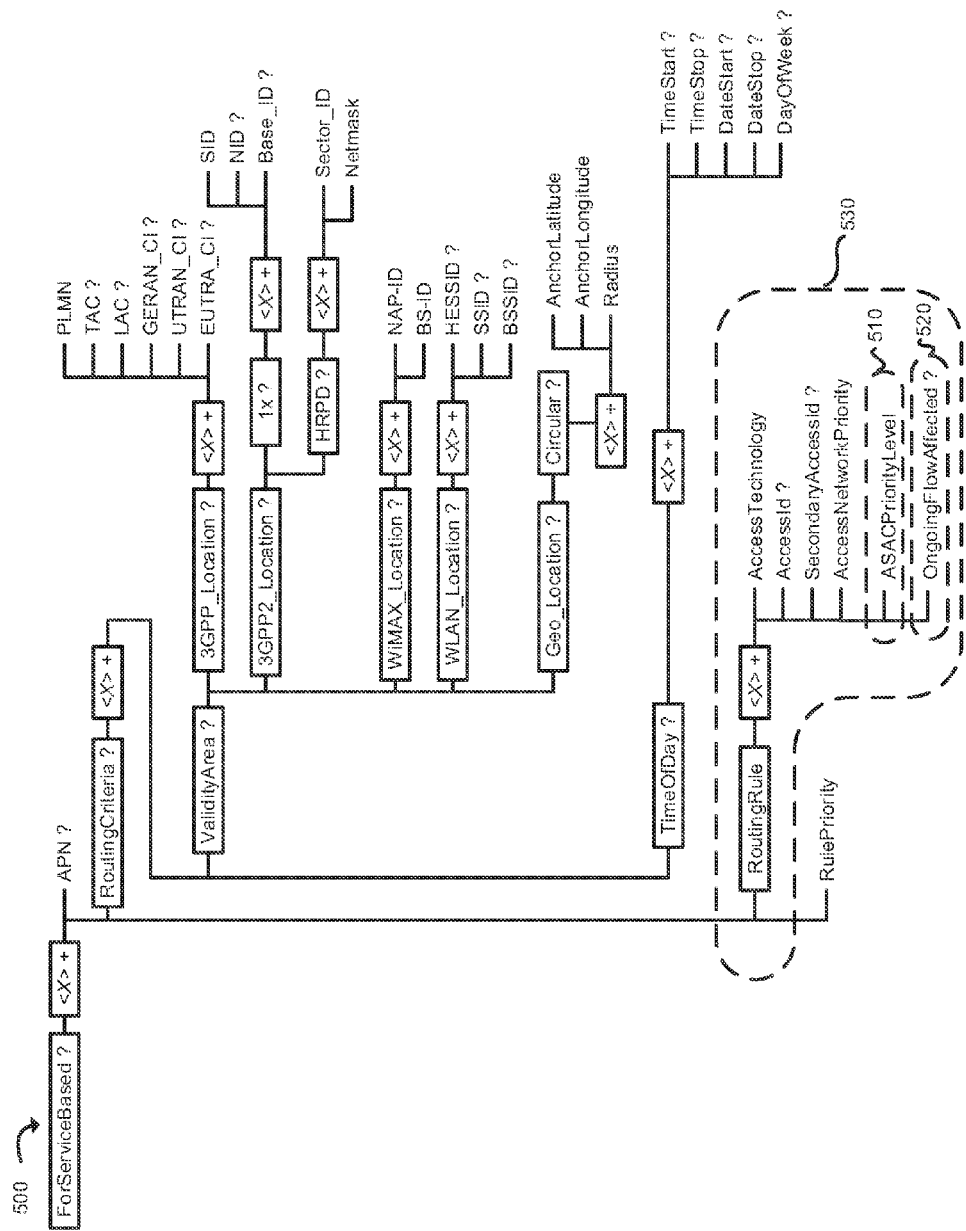
FIG. 5 is a diagram illustrating an exemplary structure of a ForServiceBased node that is a sub-object of an inter-system routing policy (ISRP) node in accordance with an example.

FIG. 5 is a diagram illustrating an example of a possible structure of a ForServiceBased node 500 that is a sub-object of the inter-system routing policy (ISRP) node 132 depicted in the ANDSF MO 120 of FIG. 1*b*. In this example, the ASAC priority level leaf 510 and the ongoing flow affected leaf 520 can be included under the routing rule sub-object 530 as depicted. However, if this approach defines priorities using only APNs, it may not provide the ability to distinguish applications with the same level of granularity that may be achieved using the examples shown in FIGS. 3-4.

Figure 6:
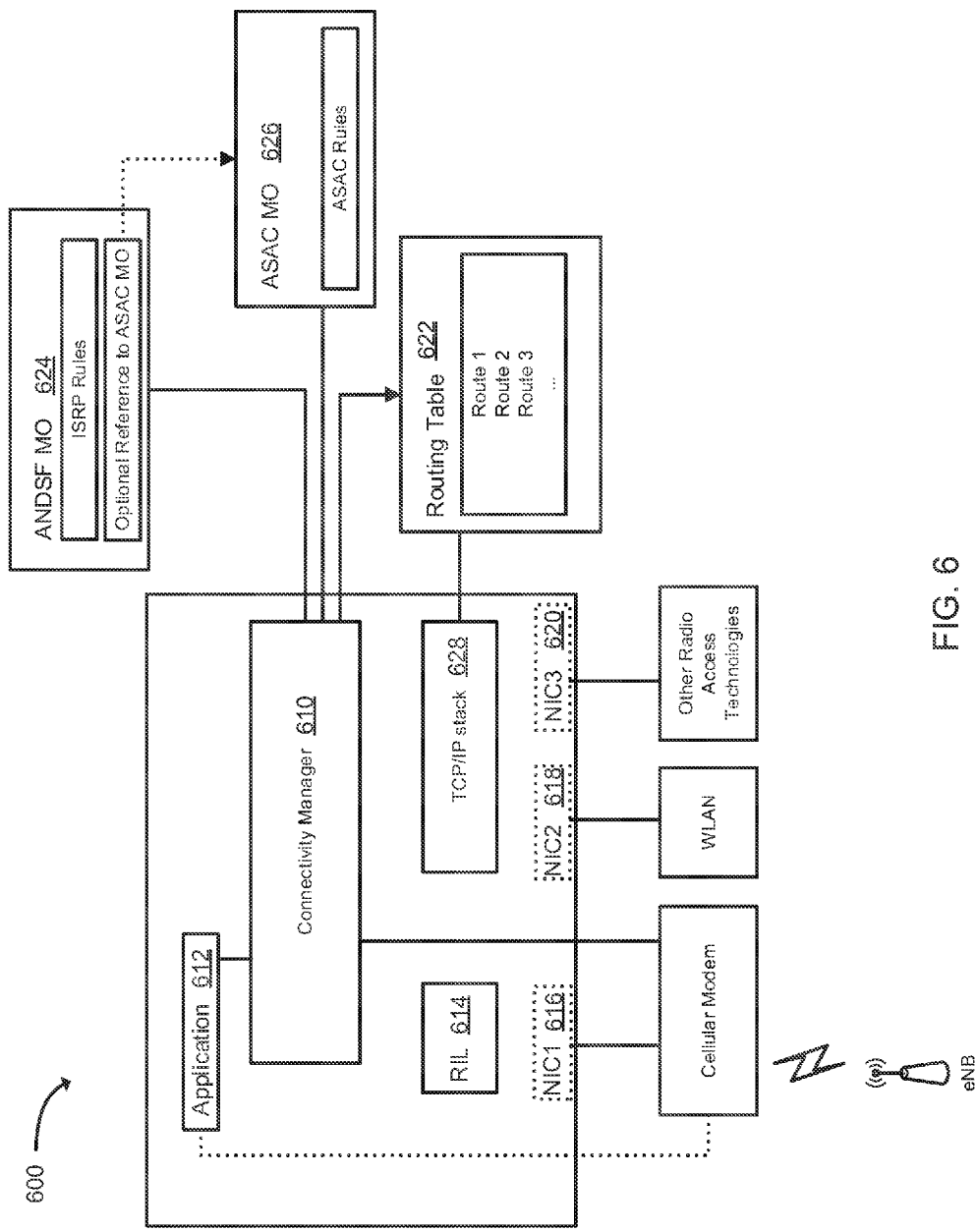
FIG. 6 illustrates an exemplary system in which a connectivity manage (CM) may operate in accordance with an example.

FIG. 6 is a diagram illustrating an exemplary system 600 in which a connectivity manager (CM) may operate. The CM 610 (i.e., the CM module) can receive a request for a connection from an application 612. From the type of service that is requested (e.g., internet connectivity), the CM 610 can determine an APN and the radio access technologies that may be suitable to provide the service. If necessary, the radio interface layer (RH) 614 or the CM 610 can create one or more network interfaces (NICs), such as NIC1 616, NIC2 618, and NIC3 620, for the suitable radio access technologies (e.g., 3GPP, WLAN) and create or update related entries in the routing table(s) 622. Depending on the availability of the network interfaces for specific radio access technologies, the routing rules in the routing table(s) 622 (e.g., default routes for certain traffic), and the flow distribution rules in the ANDSF MO 624, the CM 610 can then select a radio access technology and establish a PDN connection via the selected radio access technology (if such a PDN connection does not already exist as a result of a previous request of another application/service).

In some embodiments, when the application 612 sends a request to the CM 610 for a connection, the CM 610 can first check whether an IP flow for the requesting application matches an IP flow description (and corresponding ASAC rule) in an ASAC MO 626. There may be a default ASAC rule that applies to IP flows that do not match any flow description in the ASAC MO 626. In some embodiments, as explained above, the ASAC MO (i.e., ASAC container) may be referenced within the ANDSF MO 624. If an applicable ASAC rule, taken in context with application-barring information received from a network, prohibits granting a connection to the application 612, the CM 610 can determine that the radio access technology of that network is not suitable for a connection to the application 612.

If a network using an alternative radio access technology does not prohibit granting a connection to the requesting application, the CM 610 can service the requesting application's request using the alternative radio access technology. If the CM 610 cannot service the request, the CM 610 can send a reject message to the application 612. In some embodiments, the CM 610 can memorize the rejected request. When a radio access technology (RAT) becomes available again for the application 612, the CM 610 can notify the application 612 that a RAT is available for a connection. The application 610 can then repeat the request if needed. In some embodiments, the CM 610 can notify the application 610 when a RAT becomes available only if the application 610 specifically asks for such a notification.

Once a successful PDN connection has been established, the CM 610 can update the routing table(s) 622, if necessary, by adding a new application-specific routing rule. The TCP/IP stack can use the routing table(s) to select a network interface for the routing of uplink data packets the TCP/IP stack 628 receives from the application 612. In some embodiments, there may be multiple application-specific routing rules in the routing table(s) 622 if an application can use more than one radio access technology.

In some embodiments, a parameter called "metric" (herein "the metric parameter") can be assigned to the routing rules in the routing table(s) 622. The metric parameter can be used to define a priority for a routing rule so that, even if the routing table(s) 622 includes more than one rule that applies to a user data packet, a routing rule with the highest priority can be chosen by the TCP/IP stack 628 for the user data packet.

In some embodiments, there is only one application-specific routing rule per application 612. Each time the network changes the application specific access control, the CM 610 can to update the routing rule accordingly (e.g., by changing the NIC(s) included in the rule). In another embodiment, there can be multiple application specific routing rules in the routing table(s) 622 if an application 612 can use more than one access technology. The CM 610 can update the metric parameter of one or more of applicable rules (e.g., the metric parameter of a rule for routing via 3GPP access) when the application specific access control information for access through a certain RAT (3GPP) changes.

Handling Ongoing IP Flows

In some embodiments, when a UE receives updated application-barring information, a check can be performed to determine whether the updated application-barring information affects the routing for any ongoing IP flow. The technical feasibility of this option may depend on the TCP/IP stack implementation, since, in some implementations, a change of a routing rule will result in a release of the TCP connection.

In some embodiments, an IP flow for an operator service application can be considered as ongoing if there is already a PDN connection for the IP flow and a related rooting rule in the routing table(s) 622. To find out whether an IP flow for an over-the-top (OTT) application is ongoing, the CM 610 can query the operating system to ascertain whether any packets have been transferred using the specific port(s) assigned to the OTT application.

In some embodiments, if 3GPP access for the application 612 becomes barred for the ongoing IP flow due to updated application-barring information, and the OngoingFlowAffected leaf (e.g., 392 as illustrated in FIG. 3) in the ASAC MO 626 indicates that re-routing via other radio access technologies is not allowed, the CM 610 can update the internal routing tables to bar the IP flow. Hence, when the application 612 provides user data packets for uplink transmission, the TCP/IP stack will not be able to deliver them to the user plane of the cellular modem. If the OngoingFlowAffected leaf in the ASAC MO 626 indicates that re-routing via other access technologies is allowed, the CM 610 can select an alternative radio access technology (e.g., WLAN) and attempt to establish a PDN connection via the alternative radio access technology. The CM 610 can also update the routing tablets) 622. When the application 612 provides user data packets for uplink transmission, the TCP/IP stack can route these packets TIE-internally to the user plane for the alternative radio access technology.

In some embodiments, if 3GPP access for the application 612 becomes available again for the ongoing IP flow due to updated application-barring information received from the network, and the OngoingFlowAffected leaf (e.g., 392 as illustrated in FIG. 3) in the ASAC MO 626 indicates that re-routing via other access technologies is not allowed, the CM 610 can update the routing table(s) 622 to resume the IP flow via 3GPP access. Then, when the application 612 provides user data packets for uplink transmission, the TCP/IP stack 628 can deliver them to the user plane of the cellular modem. In some embodiments, if there is already a PDN connection established for the IP flow via another radio access technology and a related routing rule in the routing tablets) 622, the CM 610 need not update the internal routing tables. Thus, when the application 612 provides user data packets for uplink transmission, the TCP/IP stack 628 can continue delivering the user data packets via the non-3GPP PDN connection.

In some embodiments, the OngoingFlowAffected leaf in the ASAC MO 626 may indicate that re-routing via other radio access technologies is allowed. If there is already a 3GPP PDN connection for the IP flow established, the CM 610 can update the routing table(s) 622. Thus, when the application 612 provides user data packets for uplink transmission, the TCP/IP stack 628 can route these packets UE-internally to the 3GPP PDN connection, unless there is a PDN connection via an alternative radio access technology which has a higher access priority according to the ANDSF MO 624. Optionally, if there is no 3GPP PDN connection established, and the 3GPP access technology has a higher access network priority in the ANDSF MO 626 than the radio access technology of the existing PDN connection(s), the CM 610 can try to establish a 3GPP PDN connection and update the routing table(s) 622 accordingly so that the TCP/IP stack 628 can route the user data packets via the 3GPP PDN connection. Barred or unused PDN connections may be freed if the application-barring information from the network falls below a certain minimum threshold level or if there are other indications of excessive overloading/congestion in network.

Signaling of Application-Barring Information from the Network to the UE

In some embodiments, when congestion occurs in a network, the network can broadcast application-barring information via a system information broadcast so that UEs in IDLE mode can receive it. The network can provide the information additionally via dedicated signaling (e.g., for UEs in CONNECTED mode).

FIG. 7 illustrates a non-limiting example of code that may be used to the effect that application-barring information may be included in a system information broadcast (system information block 2 (SIB2), 3GPP TS 36.331).

FIG. 8 illustrates a non-limiting example of a table of SIB2 field descriptions that can be associated with the example code of FIG. 7. As illustrated, the congestion level indication is an indication of a congestion level in the cell. A selected maximum number of congestion levels in a cell is defined as "maxCongestionLevels". In this example, a congestion level indication of 0 indicates that there is no congestion. These values can be included in the SIB code illustrated in the example of FIG. 7.

In one embodiment, the network can send a congestion level (e.g., an integer value from 0 to n). This is the minimum priority level which an IP flow or application needs to have in order to be allowed to establish a PDN connection or send user data. By default, the lowest congestion level can be 0; a congestion level of 0 need not be signaled by the network. In embodiments where the maximum congestion level n=1 the network can only effectively only signal "overload on/off."

In another embodiment, the network can broadcast a bitmap wherein each bit corresponds to a specific IP flow in an ordered list of IP flows in the ASAC MO. For applications that are not associated with an IP flow for which there is an IP flow description in the ASAC MO, the network can broadcast an additional bit in the bitmap to represent a default barring status.

In some embodiments, the network can provide application-barring information about non-3GPP radio access technologies in addition to application-barring information about 3GPP. There are several ways in which the network can provide application-barring information about non-3GPP radio access technologies. In one option, the network can signal separate application-barring information for non-3GPP access technologies, such as Institute of Electronics and Electrical Engineers (IEEE) 802.11, Bluetooth, IEEE 802.16, and other non-3GPP access technologies. The network can, in one example, signal a congestion level for a WLAN operating based on a non-3GPP access technology with a specific service set identifier (SSID) value. In another example, the network can signal this congestion level for all WLANs by not including any specific SSID. Alternatively, the network can send a signal indicating that the same application-barring information (e.g., congestion level) that was sent for 3GPP access is also applicable for non-3GPP access. This option would be useful if the congestion occurs deep in the core network at the PDN gateway (P-GW); rerouting data traffic would not alleviate this type of congestion because the packets would eventually be routed to the same P-GW.

Signaling Application-Barring Information Inside the UE

In some embodiments, inside a UE, application-barring information received from a network is forwarded by the cellular protocol stack to the entity that is also using the ANDSF MO. In some embodiments, the entity using the ANDSF MO is a CM. The cellular protocol stack can use a new attention (AT) command (see 3GPP TS 27.007 version 12.6.0) to signal to the CM. The CM can send a request to the cellular protocol stack to start or stop application-barring information reporting. The cellular protocol stack can respond immediately with the current application-barring information received from the network, if any, and provides additional unsolicited updates to the CM later when the network updates the application-barring information.

FIG. 9a illustrates a table detailing a first non-limiting example of syntax for an AT command that may be used by a CM to configure a cellular protocol stack to forward application-barring information to the CM. The mode parameter can be an integer value of 0 or 1. A mode value of 0 can disable unsolicited application-barring information reporting, while a mode value of 1 can enable unsolicited application-barring information reporting. The congestion level (CongLevel) parameter can be an integer value ranging from 0 to 9, where higher numbers denote higher congestion levels.

FIG. 9b illustrates a table detailing a second non-limiting example of syntax for an AT command that may be used by a cellular protocol stack to forward, upon request from a CM, application-barring information to the CM. The CongLevel parameter can be an integer value ranging from 0 to 9, where higher numbers denote higher congestion levels.

FIG. 9c illustrates a table detailing a third non-limiting example of syntax for an AT command that may be used by a cellular protocol stack to forward, upon request from a CM, application-barring information to the CM. The priority level (PrioLevel) parameter can be an integer value ranging from 0 to 9, where 0 signifies that applications at all priority levels are allowed to establish network connections and 9 signifies that only applications at a highest priority level are allowed to establish network connections.

Figure 10:
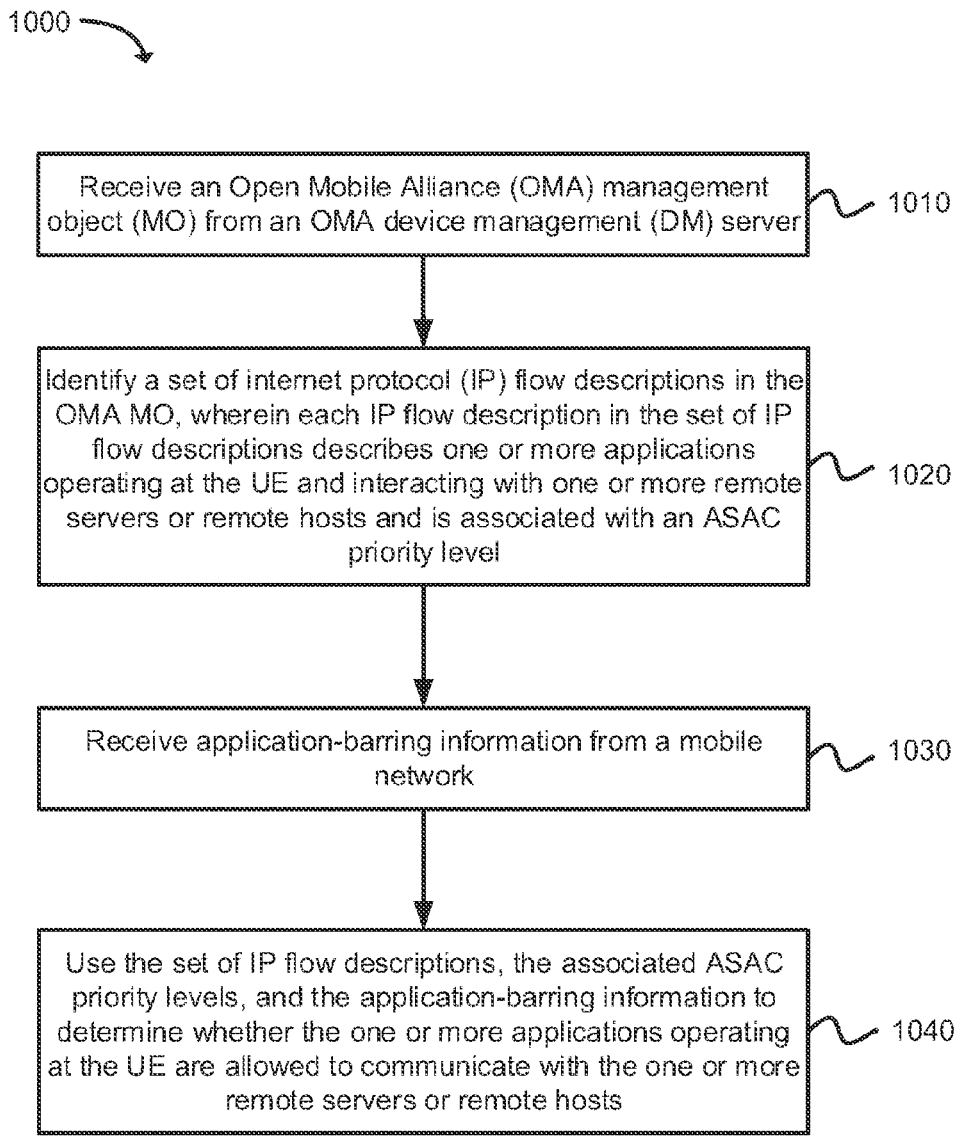
FIG. 10 is a flow diagram illustrating steps that can be applied at a user equipment (UE) in accordance with an example.

FIG. 10 is a flow diagram illustrating steps 1000 that can be applied at UE in accordance with some embodiments. As in 1010, circuitry at the UE can be configured to receive an Open Mobile Alliance (OMA) management object (MO) from an OMA device management (DM) server. The OMA MO may comprise an ASAC MO. As in 1020, circuitry at the UE can be configured to identify a set of Internet protocol (IP) flow descriptions in the OMA MO. Each IP flow description in the set of IP flow descriptions can describe one or more applications operating at the UE and interacting with one or more remote servers or remote hosts. An IP flow description may comprise one or more of an empty IP flow node, an operating system specific application ID (OSAppID), a fully qualified domain name (FQDN), or one or more packet filter components as defined in Third Generation Partnership Project (3GPP) Technical Specification (TS) 24.312 version 12.6.0. The OMA MO may define an ASAC priority level for each IP flow description. The set of IP flow descriptions may comprise an ordered list. As in 1030, circuitry at the UE can be configured to receive application-barring information from a mobile network. The application-barring information may be included in a system information broadcast or in a dedicated signal. The application-barring information may comprise a level of network traffic congestion. The application-barring information may comprise a bitmap comprising a sequence of bits wherein each bit corresponds to an IP flow description in an ordered list of IP flow descriptions. As in 1040, circuitry at the UE (which may comprise a connectivity manager (CM)) can be configured to use the set of IP flow descriptions (which may be comprise an ordered list), the associated ASAC priority levels, and the application-barring information to determine whether the one or more applications operating at the UE are allowed to communicate with the one or more remote servers or remote hosts.

Figure 11:
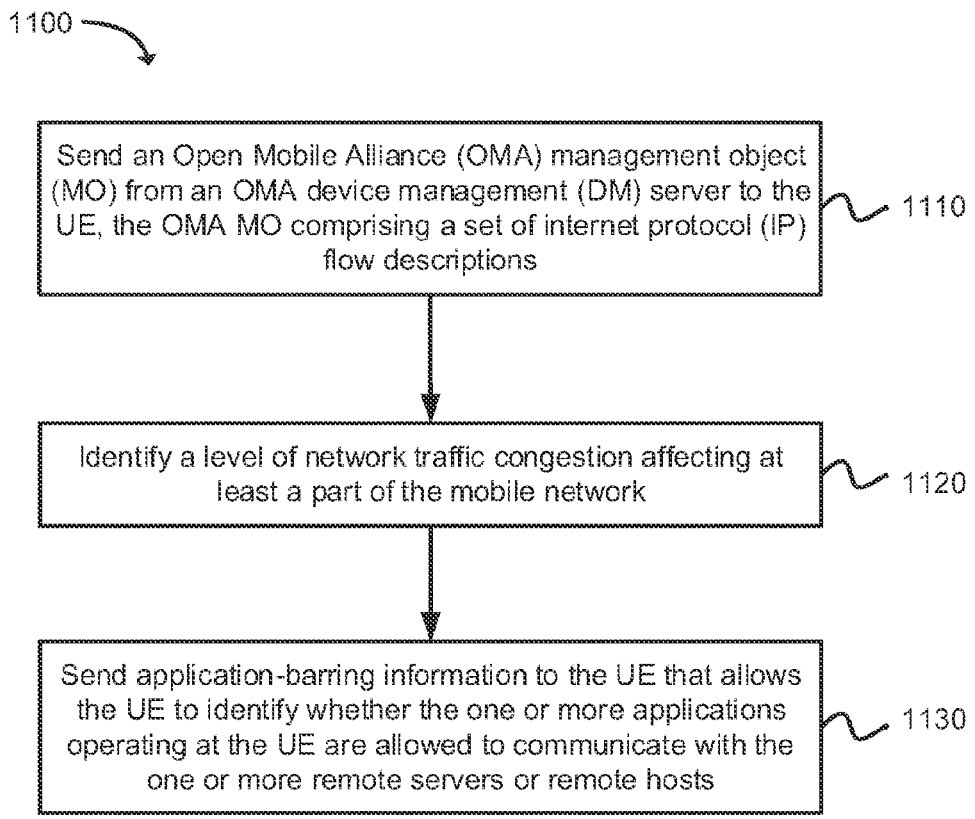
FIG. 11 is a flow diagram illustrating steps that can be applied at a mobile network in accordance with an example.

FIG. 11 is a flow diagram illustrating steps 1100 that can be applied at a mobile network in accordance with some embodiments. As in 1110, circuitry at the network can be configured to send an Open Mobile Alliance (OMA) management object (MO) from an OMA device management (DM) server to a UE. The OMA MO may comprise a set of internet protocol (IP) flow descriptions. The OMA MO may comprise an ASAC MO. Each IP flow description in the set of IP flow descriptions can describe one or more applications operating at the UE and communicating with one or more remote servers or remote hosts. An IP flow description may comprise one or more of an empty IP flow node, an operating system specific application ID (OSAppID), a fully qualified domain name (FQDN), or one or more packet filter components as defined in Third Generation Partnership Project (3GPP) Technical Specification (TS) 24.312 version 12.6.0. The OMA MO may define an ASAC priority level for each IP flow description. The set of IP flow descriptions may comprise an ordered list. As in 1120, circuitry at the network can be configured to determine a level of network traffic congestion affecting at least a part of the mobile network. As in 1130, circuitry at the network can be configured to send application-barring information to the UE that allows the UE to identify whether the one or more applications operating at the UE are allowed to communicate with the one or more remote servers or remote hosts. The application-barring information may be included in a system information broadcast or in a dedicated signal. The application-barring information may comprise a level of network traffic congestion. The application-barring information may comprise a bitmap comprising a sequence of bits wherein each bit corresponds to an IP flow description in an ordered list of IP flow descriptions.

Figure 12:
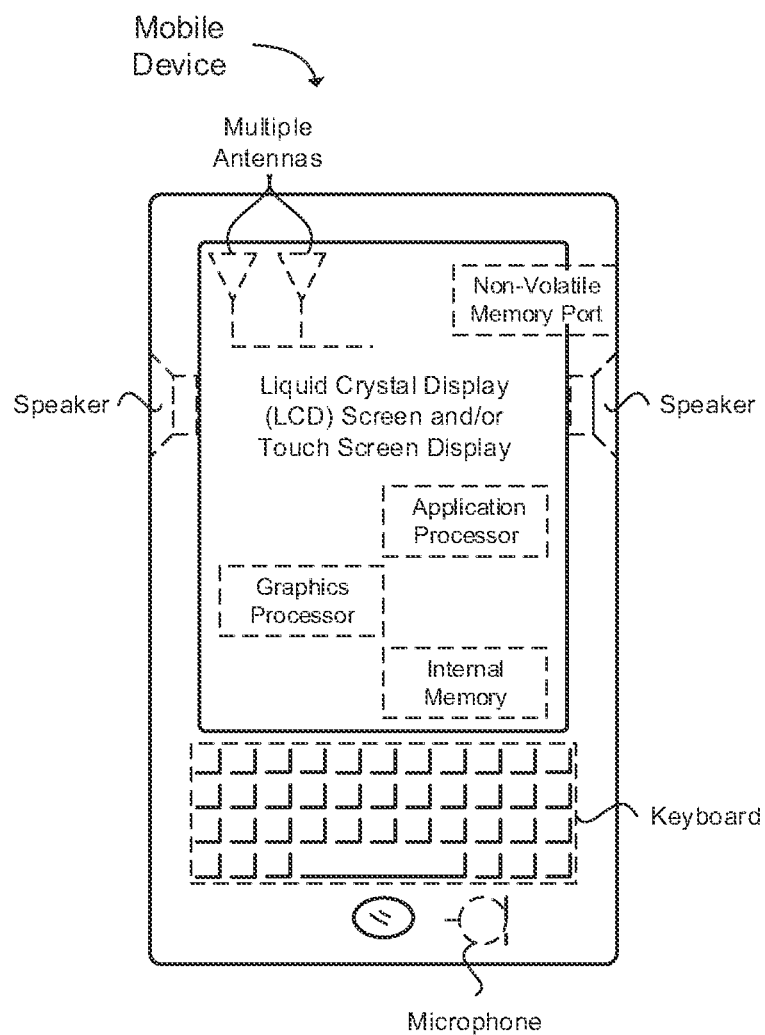
FIG. 12 illustrates a functional block diagram of a wireless communication device in accordance with some embodiments.

FIG. 12 provides an example illustration of the wireless device, such as a user equipment (UE), a mobile station (MS), a mobile wireless device, a mobile communication device, a tablet, a handset, or other type of wireless device. The wireless device can include one or more antennas configured to communicate with a node, macro node, low power node (LPN), or, transmission station, such as a base station (BS), an evolved Node B (eNB), a baseband unit (BBU), a remote radio head (RRH), a remote radio equipment (RRE), a relay station (RS), a radio equipment (RE), or other type of wireless wide area network (WWAN) access point. The wireless device can be configured to communicate using one or more wireless communication standards including 3GPP LTE, WiMAX, High Speed Packet Access (HSPA), Bluetooth, and WLAN. The wireless device can communicate using separate antennas for each wireless communication standard or shared antennas for multiple wireless communication standards. The wireless device can communicate in a wireless local area network (WLAN), a wireless personal area network (WPAN), and/or a WWAN.

FIG. 12 also provides an illustration of a microphone and one or more speakers that can be used for audio input and output from the wireless device. The display screen may be a liquid crystal display (LCD) screen, or other type of display screen such as an organic light emitting diode (OLED) display. The display screen can be configured as a touch screen. The touch screen may use capacitive, resistive, or another type of touch screen technology. An application processor and a graphics processor can be coupled to internal memory to provide processing and display capabilities. A non-volatile memory port can also be used to provide data input/output options to a user. The non-volatile memory port may also be used to expand the memory capabilities of the wireless device. A keyboard may be integrated with the wireless device or wirelessly connected to the wireless device to provide additional user input. A virtual keyboard may also be provided using the touch screen.

Various techniques, or certain aspects or portions thereof, may take the form of program code (i.e., instructions) embodied in tangible media, such as floppy diskettes, CD-ROMs, hard drives, non-transitory computer readable storage medium, or any other machine-readable storage medium wherein, when the program code is loaded into and executed by a machine, such as a computer, the machine becomes an apparatus for practicing the various techniques. Circuitry can include hardware, firmware, program code, executable code, computer instructions, and/or software. A non-transitory computer readable storage medium can be a computer readable storage medium that does not include signal. In the case of program code execution on programmable computers, the computing device may include a processor, a storage medium readable by the processor (including volatile and non-volatile memory and/or storage elements), one or more input devices, and one or more output devices. The volatile and non-volatile memory and/or storage elements may be a RAM, EPROM, flash drive, optical drive, magnetic hard drive, solid state drive, or other medium for storing electronic data. The node and wireless device may also include a transceiver module, a counter module, a processing module, and/or a clock module or timer module. One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

It should be understood that many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "an example" means that a particular feature, structure, or characteristic described in connection with the example is included in one or more embodiments of the present invention. Thus, appearances of the phrases "in an example" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as defacto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of layouts, distances, network examples, etc., to provide a thorough understanding of embodiments of the invention. One skilled in the relevant art will recognize, however, that the invention can be practiced without one or more of the specific details, or with other methods, components, layouts, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A user equipment (UE) operable to communicate data in a mobile network, the UE comprising one or more processors configured to:
   receive an Open Mobile Alliance (OMA) management object (MO) from an OMA device management (DM) server;
   identify a set of internet protocol (IP) flow descriptions in the OMA MO, wherein an IP flow description in the set of IP flow descriptions describes one or more applications operating at the UE and interacting with one or more remote servers or remote hosts, and the IP flow description includes an operating system specific application ID (OSAppID) for the one or more applications operating at the UE;
   receive application-barring information from the mobile network; and
   use the set of IP flow descriptions in the OMA MO and the application-barring information to determine whether the one or more applications operating at the UE are allowed to communicate with the one or more remote servers or remote hosts.

2. The UE of claim 1, wherein one or more IP flow descriptions in the set of IP flow descriptions further comprises one or more of:
   an empty IP flow node;
   a fully qualified domain name (FQDN);
   one or more packet filter components as defined in Third Generation Partnership Project (3GPP) Technical Specification (TS) 24.312 version 12.6.0; or
   a combination thereof.

3. The UE of claim 1, wherein the application-barring information is received in one or more of: a dedicated signaling message or a system information broadcast.

4. The UE of claim 1, wherein the application-barring information comprises a level of traffic congestion on the mobile network.

5. The UE of claim 1, wherein a priority level is assigned to each IP flow description in the set of IP flow descriptions.

6. The UE of claim 1, wherein a default priority level is assigned to applications that are not described by an IP flow description in the set of IP flow descriptions.

7. The UE of claim 5, wherein the one or more processors are further configured to determine whether the one or more applications operating at the UE are allowed to establish a packet data network (PDN) connection with the mobile network based on the priority levels assigned to the one or more IP flow descriptions that correspond to the one or more applications and on a level of traffic congestion received in the application-barring information.

8. The UE of claim 5, wherein the one or more processors are further configured to determine whether the one or more applications operating at the UE are allowed to communicate with the one or more remote servers or remote hosts based on the priority levels assigned to the one or more IP flow descriptions that correspond to the one or more applications and on a level of traffic congestion received in the application-barring information.

9. The UE of claim 8, wherein the UE is able to communicate data via one or more alternative radio access technologies (RATs) and the one or more processors are further configured to communicate with the one or more remote servers or remote hosts via the one or more alternative RATs if communication via a first RAT is not allowed.

10. The UE of claim 1, wherein the UE is able to communicate data via a first radio access technology (RAT) and one or more alternative radio access technologies (RATs) and a priority level is assigned to each IP flow for the first RAT and to each IP flow for one or more of the one or more alternative RATs.

11. The UE of claim 10, wherein the one or more processors are further configured to determine whether the one or more applications operating at the UE are allowed to communicate with the one or more remote servers or remote hosts via the first RAT based on:
   the priority levels assigned for the first RAT to the one or more IP flow descriptions that correspond to the one or more applications; and
   a level of traffic congestion received for the first RAT in the application-barring information.

12. The UE of claim 11, wherein, if communication via the first RAT is not allowed, the one or more processors are further configured to determine whether the one or more applications operating at the UE are allowed to communicate with the one or more remote servers or remote hosts via the one or more alternative RATs based on the priority levels assigned for the one or more alternative RATs to the IP flow descriptions and based on a level of traffic congestion received for the one or more alternative RATs in the application-barring information.

13. The UE of claim 1, wherein the set of IP flow descriptions comprises an ordered list of IP flow descriptions.

14. The UE of claim 13, wherein the application-barring information from the mobile network comprises a bitmap, the bitmap comprising a sequence of bits wherein each bit corresponds to an IP flow description in the ordered list of IP flow descriptions.

15. The UE of claim 14, wherein the one or more processors are further configured to determine whether the one or more applications operating at the UE are allowed to establish a packet data network (PDN) connection with the mobile network based on a setting of the bits corresponding to one or more IP flow descriptions that correspond to the one or more applications.

16. The UE of claim 1, wherein the one or more processors are further configured to operate a connectivity manager (CM) module, the CM module using the set of IP flow descriptions and the application-barring information to determine whether the one or more applications operating at the UE are allowed to establish a packet data network (PDN) connection with the mobile network.

17. The UE of claim 16, wherein the CM module is further configured to use the set of IP flow descriptions and the application-barring information to determine whether the one or more applications operating at the UE are allowed to continue using existing PDN connections with the mobile network.

18. The UE of claim 16, wherein the application-barring information is received by a radio resource control (RRC) layer in the UE and provided to the CM module via an attention (AT) command.

19. The UE of claim 16, wherein the CM module reads one or more rules from one or more routing tables, the one or more routing tables being used by a transmission control protocol/internet protocol (TCP/IP) stack at the UE for routing uplink packets from the UE.

20. The UE of claim 19 wherein the CM module is configured to modify the one or more routing tables by one or more of: adding new rules, modifying existing rules, or deleting existing rules.

21. The UE of claim 20, wherein the one or more rules in the routing table are set or modified based on the one or more IP flow descriptions in the set of IP flow descriptions and the application-barring information.

22. The UE of claim 20, wherein the one or more rules in the routing table are set or modified according to a radio access technology (RAT) determined to be used to communicate with the one or more remote servers or remote hosts.

23. A network node in a mobile network operable to communicate data to a user equipment (UE), the network node in the mobile network comprising one or more processors configured to:

send an Open Mobile Alliance (OMA) management object (MO) from an OMA device management (DM) server to the UE, the OMA MO comprising a set of internet protocol (IP) flow descriptions, wherein an IP flow description in the set of IP flow descriptions describes one or more applications operating at the UE and communicating with one or more remote servers or remote hosts, and the IP flow description includes an operating system specific application ID (OSAppID) for the one or more applications operating at the UE;

identify a level of network traffic congestion affecting at least a part of the mobile network; and send application-barring information to the UE that allows the UE to identify whether the one or more applications operating at the UE are allowed to communicate with the one or more remote servers or remote hosts.

24. The network node of claim 23, wherein one or more IP flow descriptions in the set of IP flow descriptions further comprises one or more of:

an empty IP flow node object;

a fully qualified domain name (FQDN);

one or more packet filter components of any type defined in a as defined in Third Generation Partnership Project (3GPP) Technical Specification (TS) 24.312 version 12.6.0; or a combination thereof.

25. The network node of claim 23, wherein the application-barring information is sent in one or more of: a dedicated signaling message to the UE or a system information broadcast.

26. The network node of claim 23, wherein the application-barring information comprises the level of traffic congestion on the mobile network.

27. The network node of claim 23, wherein the one or more processors are configured to send updated application-barring information if the level of traffic network congestion changes.

28. The network node of claim 23, wherein the set of IP flow descriptions comprises an ordered list of IP flow descriptions.

29. The network node of claim 28, wherein the application-barring information comprises a bitmap, the bitmap comprising a sequence of bits wherein each bit corresponds to an IP flow description in the ordered list of IP flow descriptions.

30. The network node of claim 28, wherein the setting of the bits corresponding to the one or more IP flow descriptions indicates whether the one or more applications operating at the UE and corresponding to the one or more IP flow descriptions are allowed to establish a packet data network (PDN) connection with the mobile network.

* * * * *